July 2, 1963 D. N. LEE 3,096,510
CIRCUIT FOR SENSING SIGNAL OUTPUT OF A MAGNETIC-CORE MEMORY
Filed Nov. 25, 1960
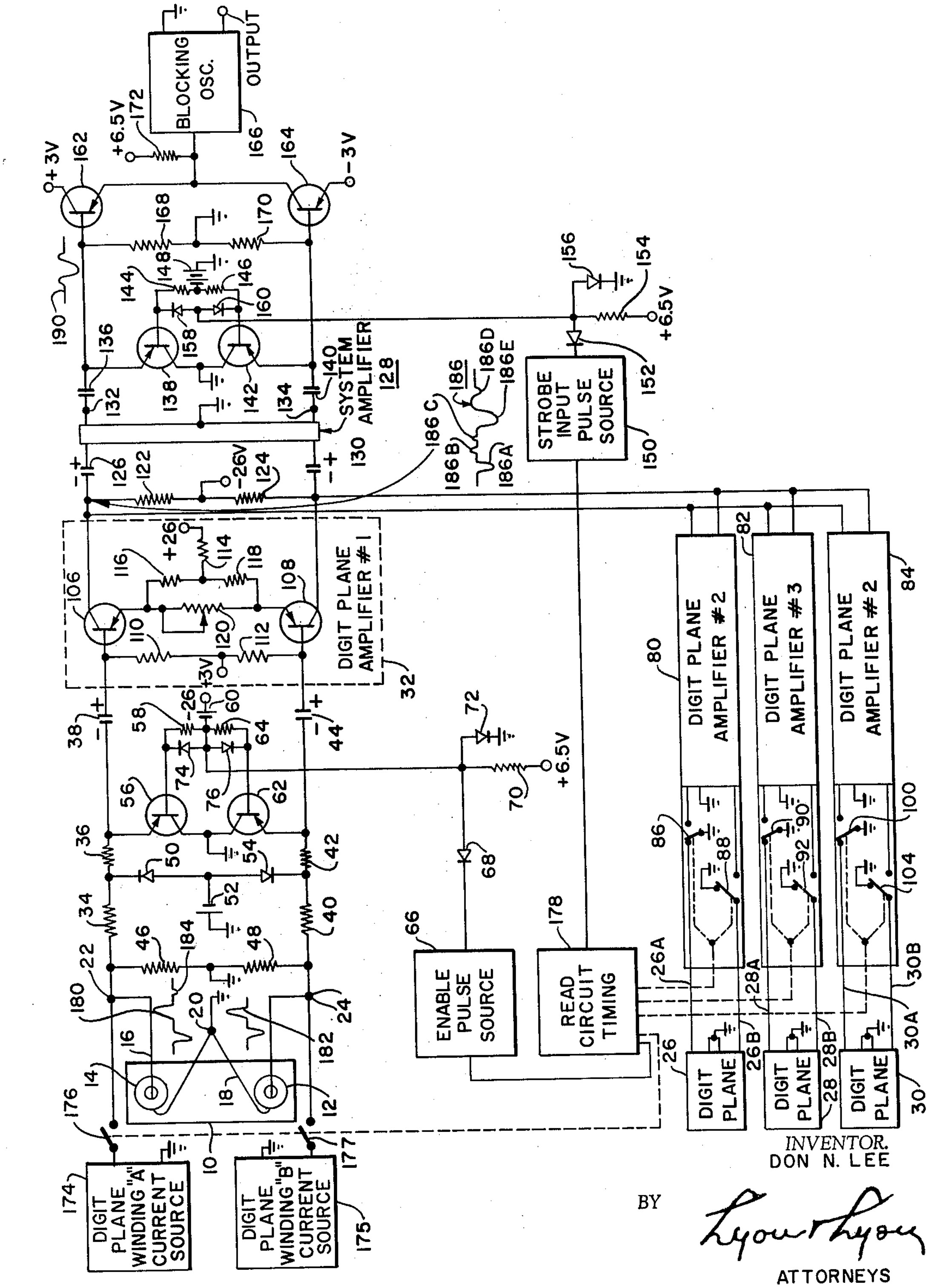
INVENTOR.
DON N. LEE
BY Lyon & Lyon
ATTORNEYS Patented July 2, 1963

3,096,510

CIRCUIT FOR SENSING SIGNAL OUTPUT OF A MAGNETIC-CORE MEMORY

Don N. Lee, Torrance, Calif., assignor, by mesne assignments, to Ampex Corporation, Redwood City, Calif., a corporation of California
Filed Nov. 25, 1960, Ser. No. 71,783
3 Claims. (Cl. 340—174)

This invention relates to circuits employed for reading out the information stored in magnetic-core memories and, more particularly, to improvements therein.

A favorite construction for magnetic-core memories at present is to fabricate the memory using a large number of what are called "digit-core planes." Each one of these will comprise an array of magnetic cores, usually in columns and rows, with windings coupled to the cores for driving them from one of their states of magnetic remanence to the other, either for the purpose of storage of digital information in the cores or for the purpose of reading out the information stored in those cores. In each core plane there is usually provided what is called a digit-plane winding. This is a winding which may be inductively coupled to all the cores in a core plane, or, preferably, two of these windings are provided, each one of which is coupled to half the cores in a core plane. These digit-plane windings are used for the purpose of inhibiting a core against being driven from one to the other of its states of magnetic remanence during the process of writing data into the magnetic-core memory. These digit-plane windings are also employed for sensing the data which has been stored in a digit plane. Such sensing occurs by reason of the application of a drive to the digit-core plane, which will cause a magnetic core to go from one to the other of its states of magnetic remanence if not already in such other state. As a result of such transfer, a voltage is induced in the digit-plane winding, or, if no transfer occurs, no voltage is induced in the digit-plane winding. Thus, an indication is had of whether or not a one or zero binary bit was stored in that magnetic core.

It is presently desirable to operate a magnetic-core memory at as high a speed as possible. Thus, it is desired to turn off the inhibit current and use the digit-plane winding for reading as soon as possible thereafter. When an inhibit current which is applied to the digit-plane winding is turned off to thereafter make the winding available for its sensing function, as a result of the inductance of the digit-plane winding, a noise signal occurs on the winding comprising a negative-going voltage which can attain a peak on the order of ten volts, followed by a positive-going voltage, which also can attain a peak of ten volts. Since the signal voltage induced in the winding by a core may be on the order of 50 millivolts, it will be appreciated that any apparatus to which this noise signal, followed by the core signal, is applied will be saturated by the noise signal and will be unable to detect the magnetic-core signal. A clipping technique is not effective, because, at most, this will cause the noise signal to attain the size of the core signal, thus still making detection difficult.

An object of this invention is to provide a circuit arrangement for sensing the core signal, which eliminates any effects of the noise signal.

Another object of this invention is the provision of novel circuitry for sensing the signal produced by the turnover of the magnetic core, despite the presence of other noise signals.

Yet another object of the present invention is the provision of circuitry for sensing the output signal of a magnetic core which does not alter the direct-current level of said signal, despite the presence of noise signals.

Still another object of the invention is the provision of circuitry in the read amplifier of a magnetic-core memory which permits the use of alternating-current coupling without any direct-current level variations affecting the output.

These and other objects of the present invention may effectively be achieved by providing an arrangement wherein the sensing winding of a magnetic-core digit plane is coupled to the input of amplifier means. Also coupled across the input of said amplifier means are switch means in the form of a normally conductive transistor for bypassing any signals applied to said amplifier except desired signals. The transistor is rendered nonconductive over the interval of a reading drive, in order that the signal produced by a magnetic core is not bypassed or shunted at the input of the amplifier means. Thus, after amplification, a signal occurs at the output of the amplifier which comprises the amplified signal output of the magnetic core, plus some residual noise signal on either side of this last-named signal, due to the opening and closing of the switch across the input of the amplifier.

The output of the amplifier includes a differentiating circuit including a capacitor in series and a shunt transistor switch of the same type as has just been described. This transistor switch is normally conductive. Therefore, it and the capacitor will differentiate any signals which pass through the amplifier. This results in the direct-current level of the amplifier output, after a differentiated signal occurs, being the same as it was before the differentiated signal occurs. The differentiating circuit is interrupted, or the transistor is rendered nonconductive over the interval of the signal generated by the magnetic core being read. Therefore, the output of the amplifier at this time is the true signal output of such core. As previously indicated, its direct-current level will remain unaffected by any preceding or following signals. The output of the amplifier is then applied to a blocking oscillator to provide a reshaped signal for any following circuitry.

The novel features that are considered characteristic of this invention are set forth with particularity in the appended claims. The invention itself, both as to its organization and method of operation, as well as additional objects and advantages thereof, will best be understood from the following description when read in connection with the accompanying drawing, which is a schematic drawing of an embodiment of the invention.

Reference is now made to the drawing, which shows a schematic diagram of an embodiment of the invention. Magnetic-core memories having digit-core planes with drive windings are well known and can be purchased commercially. Accordingly, for simplification in explaining this invention, a digit-core plane will be represented by a rectangle 10, having two cores 12, 14, exemplary of the plurality of cores usually arrayed in the plane. The drive windings for the magnetic cores are not shown. However, there are represented a first digit winding 16 and a second digit winding 18, respectively coupled to the cores 14, 12, to exemplify the fact that these windings are respectively coupled to all the magnetic cores in one-half of the digit plane 10. These windings are brought out to terminals, one of which 20 is common to both windings and is grounded, and the others of which, respectively, 22 and 24, are connected to amplifying means in a manner to be described. By way of example, it will be assumed that there are three other digit planes 26, 28, 30, besides the one 10, just described, which are present in a magnetic-core memory. Each one of these will also have two digit-plane windings, respectively 26A, 26B, 28A, 28B, and 30A, 30B, coupled to a common terminal and to the output terminals, as has been described in the case of the windings 16, 18.

The terminal 22 is connected to the input of a digit-plane amplifier 32 through two resistors and a capacitor, respectively 34, 36, 38, which are connected in series with one another. Similarly, the terminal 24 is connected to the input to the digit-plane amplifier 32 through two resistors and a capacitor, respectively 40, 42, 44, which are connected in series one with another. The digit-plane amplifier 32 actually comprises two amplifiers, one of which amplifies signals from the digit winding 16 and the other of which amplifies signals from the digit winding 18. A resistor 46 is connected between the terminal 22 and ground. A resistor 48 is connected between terminal 24 and ground. A diode 50 is connected between the junction of resistors 34 and 36 and a negative bias source 52. A second diode 54 is connected between the junction of resistors 40 and 42 and the negative bias source 52. A transistor 56 has its emitter connected to the junction of resistor 36 and capacitor 38 and its collector connected to ground. The base of transistor 56 is connected through a resistor 58 to a negative bias source 60, which effectively maintains the transistor 56 conductive. A transistor 62 has its emitter connected between resistor 42 and capacitor 44 and its collector connected to ground. The base of emitter 62 is connected through a resistor 64 to the source of negative bias source 60, so that it, too, is maintained conductive in the quiescent, or standby, condition of operation.

The transistors 56 and 62 may be rendered nonconductive by a signal from an enable-pulse source 66, which is applied through a network including a diode 68 which is connected to the junction of a resistor 70 and a diode 72. Diode 72 has its cathode connected to ground. The resistor 70 has its other end connected to a positive-potential source, exemplified here as 6.5 volts. The junction of resistor 70, diode 68, and diode 72 is connected through a diode 74 to the base of transistor 56, and through a diode 76 to the base of transistor 62.

It should be noted that the circuitry just described effectively comprises two shunt transistor switches, which are connected across the inputs of the two digit-plane amplifiers 32, whereby any output from either the winding 16 or the winding 18 is shunted to ground and prevented from being amplified unless the transistor switches are rendered nonconductive. Each one of the digit-plane windings 26A, 26B, 28A, 28B, 30A, 30B are coupled to identical circuitry, as has just been described. The switch circuitry at the input to each one of the amplifiers, respectively 80, 82, 84, is represented by the switches 86, 88, 90, 92, 100, 104, which are shown normally closed and are opened by a signal from an enable source.

The structure of amplifier 32 which is about to be described is exemplary of all the amplifiers 80, 82, 84. Actually, amplifier 32 comprises two amplifiers. It includes a first transistor 106 to the base of which capacitor 38 is connected. Similarly, a second resistor 108 has capacitor 44 connected to its base. A resistor 110 is connected between the base of transistor 16 and a positive bias source. A resistor 112 is connected between the base of transistor 108 and the positive bias source. The emitters of the transistors 106 and 108 are connected to a source of positive potential through a resistance divider network, which includes a first resistor 114 connected to the junction of two other resistors 116, 118. Resistors 116 and 118 have their other ends respectively connected to the emitters of transistors 106 and 108. In order to adjust the gain of these transistors, a potentiometer 120 is connected between the emitters of the transistors 106, 108.

The collectors of the transistors 106, 108 provide the respective output signals, and these are connected to a summing network, to which the outputs of the other amplifiers 80, 82, and 84 are also connected. The summing network includes a resistor 122 connected between a negative-potential source and the collector of transistor 106 (and the collectors of all the similarly situated transistors), and another resistor 124 which is connected to the collector of transistor 108 (and to other collectors of similarly situated transistors). A capacitor 126 connects the collector of transistor 106 to a system amplifier 128. Another capacitor 130 also connects the collectors of transistor 108 to the system amplifier 128.

The details of the required system amplifier will not be shown, since two of any known types of differential amplifiers can be employed here for respectively amplifying the signals received through capacitor 126 and the signals received through capacitor 130. The outputs from the system amplifier are applied to respective output terminals 132 and 134. Output terminal 132 is connected to a differentiating network, which includes the capacitor 136 and a normally conductive transistor 138. Similarly, terminal 134 is connected to a differentiating network, which includes capacitor 140 and a normally conductive transistor 142. The emitter of transistor 138 is connected to capacitor 136, and its collector is grounded. The emitter of transistor 142 is connected to capacitor 140, and its collector is grounded. The bases of transistors 138 and 142 are connected through the respective resistors 144 and 146 to a negative-potential source 148, which maintains the transistors 138, 142 conductive.

Transistors 138 and 142 are rendered nonconductive by a pulse applied from a strobe-pulse source 150, through a network including a series-connected diode 152. A resistor 154 and a diode 156 are connected to a junction with diode 152. A positive-potential source is applied to resistor 154, and diode 156 has its cathode connected to ground. The junction made by diodes 152 and 156 and resistor 154 is connected through a diode 158 to the base of transistor 138 and another diode 160 to the base of transistor 142.

Output from the amplifier 128 is applied to two transistors, respectively 162 and 164, which are connected in emitter-follower fashion to a blocking oscillator 166. A resistor 168 is connected between the base of transistor 162 and ground; a resistor 170 is connected between the base of transistor 164 and ground. A negative potential is applied to the respective collectors of the transistors 162 and 164, and a positive potential is applied to a resistor 172 to the emitters of transistors 162 and 164.

There now follows a description of the operation of the circuitry which has just been described. During the quiescent period, that is, when there is no readout from the memory, transistors 56, 62, 138, and 142 are maintained conductive, and, thus, at the input to amplifier 32, will shunt any signals, and, at the output of amplifier 128, in association with capacitors 134 and 136, will differentiate any signal. When a readout operation of the memory is desired, the time lapse between the turnoff of any current applied to the digit-plane windings and the reading operation must be minimized. Rectangles 174 and 175 respectively represent digit-plane winding current sources which may be employed during the process of writing in the respective halves of the core plane 10, to which windings 16 and 18 are respectively coupled. Switches 176 and 177 respectively exemplify the mechanism for turning off or applying such digit-plane-winding currents as required. A rectangle, labeled read-circuit timing 178, exemplifies the source of timing signals for turning off the digit-plane-winding current source and for enabling both the enabled-pulse source 66 and the strobe-pulse source 150.

Since a current for driving the cores for reading is applied as soon as the digit-plane-winding current sources are turned off, the read-circuit timing will energize the enable-pulse source 66 for an interval as soon as the digit-plane-winding current source is turned off. The enabling interval extends while a core is being driven for reading. The read-circuit timing will enable the strobe-pulse source over an interval which is slightly less than the interval of the enable-pulse source signal. In an embodiment of the invention which was built, the strobe-pulse source was enabled for 0.3 of a microsecond, and the enable-pulse source was enabled for 0.5 of a microsecond, which started 0.1 of a microsecond before the strobe-pulse source and ended 0.1 of a microsecond thereafter.

The signals which occur at the outputs of the respective digit windings 16 and 18 are represented by the wave shapes, respectively 180 and 182. The noise portions of these signals, due to the effect of the turnoff of digit-plane current, are the large amplitude positive and negative swings. These can be on the order of 10 volts. The very small voltage swing 184, which is a part of the wave shape 180, indicates that a core was driven in the portion of the digit plane to which the winding 16 was coupled. This signal may appear only on one or the other of the two digit-plane windings—it does not appear on both. The transistors 56 and 62 are maintained conductive during the occurrence of the noise signal, and are not rendered nonconductive until after the termination of the positive-going portion of the noise signals 180 and 182. Since the transistors are maintained conductive substantially in saturation, the noise signals are effectively bypassed.

It should be noted that the transistors 56 and 62 are in the inverted configuration. The reason for this is that if these transistors were in the noninverted configuration, when they are turned off by the enabled pulse—that is, when they are rendered nonconductive—the diffusion of the turnoff signal through the collector-base junction would produce a noise componet at the collectors. This noise component would occur right at read time and would be of greater magnitude than the read signal. Obviously, this would be unsatisfactory. By operating these transistors in the inverted mode, the collector-base component of noise is eliminated. There is still some noise left even when operated in the reverse configuration because of base-emitter current at turnoff, but the base-emitter junction has much less surface area than the base-collector junction and thus the component of noise signal is made extremely small.

The transistors 56 and 62 clamp very well in the positive direction, but in the negative direction their beta is low, and thus the clamping action is not very effective. For this reason, diodes 50 and 54 are employed to limit the negative excursions to a pedetermined voltage, for example, 0.5 volt. This means that the transistors will not have to draw too much current in the negative direcion, and their voltage drops accordingly will be much less. The operation of the diodes 50, 54 can be quite slow as they have the duration of the interval of the digit drop to recover, and the positive excursions at digit turnoff time tends to recover them still further. Thus, effectively, the diodes 50, 54 serve to bypass signals which have a predetermined polarity and which exceed the value of the bias.

The enable-pulse signal from the source 66, in an embodiment of the invention which was built and operated, rose from a −4 volt level to a +1 volt level. At the +1 volt level, transistors 56 and 62 were rendered nonconductive and thus the signal 184 was enabled to get through to the amplifier 32 and, more specifically, to transistor 106, which amplified it. The positive-going enable-pulse signal causes diode 68 to be blocked, whereupon the junction of this diode and resistor 70 and diode 72 goes positive. Effectively, this results in the diodes 74 and 76 becoming conductive, whereupon they pull the bases of transistors 56 and 62 positive, causing them to be rendered nonconductive.

Since each one of the digit planes is connected through their respective digit-plane amplifiers to a common system amplifier, it should be obvious that the digit planes are not all read simultaneously, but in sequence; that is, the first signal readout occurs from digit plane 10, thereafter digit plane 26, thereafter digit plane 28, and, finally, digit plane 30, to provide a sequence of bits which represents a word. A feature of this invention is that by reason of the use of the transistor switches at the inputs to the respective digit-plane amplifiers 32, 80, 82, and 84, the collectors of these amplifiers can be connected together to a summing network without any fear of a feedback signal being applied by one of the actuated amplifiers to the other, which signal is fed back into the digit-plane winding. The shunt switches which are closed except during the actual process of reading not only shunt any signal which is fed from the digit-plane winding but also shunt any signal which might be fed back through the amplifier.

The system amplifier 128 has a signal applied to its input and, more specifically, to the input coupled to transistor 126, which resembles the waveform 186. The portions of the waveform 186A, 186B are residual digit noise, which gets through the amplier despite the presence of the shunting switches. The portions of the wave shape 186C and 186D represent noise due to the turnon and turnoff, respectively, of the shunt switches. The portion of the wave shape 186E represents the signal which has been read from the core. It will be appreciated that this signal has already been amplified and exceeds the noise signals on the wave shape 186.

The output of the amplifier 128, which is preferably a differential amplifier, is applied to the differentiating network, including the capacitor 136 and the saturation resistance of transistor 138. This differentiates the leading portion 186A, 186B, 186C of the wave shape 186. Accordingly, the level of the output line is unaffected by the presence of these noise signals, which precede the actually desired signal which has been read from the core. The strobe-pulse source is actuated effectively at the commencement of the signal from the core (represented by wave shape portion 186E). Capacitor 136 and resistor 168 do not form a differentiating network in view of the fact that resistor 168 (and resistor 170, as well) have a very high resistance. Effectively, therefore, the wave shape of the signal which is applied to the base of transistor 162 is represented by wave shape 190 and comprises the signal which has been read from the core, which has been amplified without the noise or undesired signals. Substantially, no signal is applied to the base of transistor 164, even though the noise signal 182 did appear at the input to amplifier 32 on the side connected to transistor 164. The blocking oscillator 166 generates a pulse in response to the output of transistor 162, which effectively is a reshaped signal representative of the fact that a magnetic core in the digit-core plane 10 was driven from its one to its other state of remanence.

There has accordingly been described and shown herein a novel and useful reading circuit for a magnetic-core memory of the type comprising a plurality of core planes which employ a single digit-core winding for both the inhibiting function of the core and for the sensing function of the core. A complete isolation is provided of the digit signals from the sense amplifier input. Furthermore, with this invention alternating-current coupling is provided between the read amplifiers and the digit-plane winding without shift of the operating point, either due to the frequency of occurrence or patterns of the one signals being read from the magnetic-core memory. The embodiment of the invention shown and described may be employed with an arrangement for reading the digit-core planes in sequence, as shown in the drawing, and, also, with arrangements for reading out from these digit planes simultaneously. It will be understood, of course, that when this is done there is no connection of the digit-plane amplifiers to a single-system amplifier, but each digit-plane amplifier will be followed by a second, separate amplifier which will have connected to its output the differentiating-circuit transistor-switch arrangement which has been described.

I claim:

1. In a magnetic-core memory system of the type wherein a reading drive is applied to a magnetic core to transfer it from one to the other of its states of remanence if not already in said state at the termination of other drives applied to said core, and a sense winding having output terminals is inductively coupled to said core for having a digit voltage signal induced therein should said core be transferred, a circuit for eliminating the effects of said noise signals induced in said sense winding due to termination of said other drives comprising amplifier means having an input and output, means coupling said sense winding output terminals to said amplifier means input, means for bypassing said noise signals and allowing said digit voltage signal to be applied to said amplifier means including a diode, a bias source for said diode, means connecting said diode and bias source across said sense winding output terminals for bypassing noise signals of a given polarity exceeding the amplitude of said bias source, a first transistor having collector, emitter, and base electrodes, means connecting said first transistor emitter and collector to said amplifier means input for bypassing any signals applied thereto, means for applying a bias to said first transistor base to maintain said first transistor conductive, means for applying a signal to said first transistor base to render said first transistor nonconductive upon the commencement of said reading drive over the interval of said reading drive, and means including a differentiating circuit for deriving an output signal from said amplifier means output during the interval of said reading drive which does not have its direct-current level affected by any preceding signals.

2. In a magnetic-core memory system as recited in claim 1 wherein said means for deriving an output signal from said amplifier output during the interval of said digit voltage signal includes a transistor having emitter, collector, and base electrodes, means including a capacitor connected in series with said emitter for connecting said emitter and collector across said amplifier output, means for applying a bias to said transistor base for rendering said transistor conductive during the interval of a reading drive.

3. In a magnetic-core memory system of the type wherein a combined sense and digit plane winding is coupled to a magnetic core and a current applied to said winding is interrupted in order to permit said winding to have a digit voltage signal induced therein in response to a reading drive applied to said magnetic core, a circuit for eliminating the effects of noise signals induced in said sense and digit plane winding at the termination of said current comprising amplifier means having an input and an output, means coupling said amplifier means input to said sense and digit plane winding, a signal bypass circuit connected across said amplifier means input including a first transistor having an emitter, collector, and base electrode, means for applying a bias to said first transistor base for maintaining it conductive, means for connecting said first transistor emitter and collector to said amplifier input for bypassing signals therethrough and biased diode means connected across said amplifier means input for bypassing signals having a predetermined polarity and amplitude, a differentiating circuit coupled to said amplifier means output including a second transistor having emitter, base, and collector electrodes, a capacitor connected to said second transistor emitter, means connecting said second transistor collector and said capacitor to said amplifier means output, means for applying a bias to said second transistor base to maintain it conductive, means for rendering said first transistor nonconductive upon the application of a reading drive to said core for an interval determined by said reading drive, means for rendering said second transistor nonconductive during the interval of said reading drive, and means for deriving an output from said amplifier means output during said reading drive.

References Cited in the file of this patent

UNITED STATES PATENTS

| | | |
|---|---|---|
| 2,918,586 | Curtis | Dec. 22, 1959 |
| 2,995,664 | Deuitch | Aug. 8, 1961 |